No. 827,117. PATENTED JULY 31, 1906.
W. VON PITTLER.
POWER TRANSMISSION DEVICE FOR MOTOR CARS, &c.
APPLICATION FILED DEC. 12, 1905.
2 SHEETS—SHEET 1.
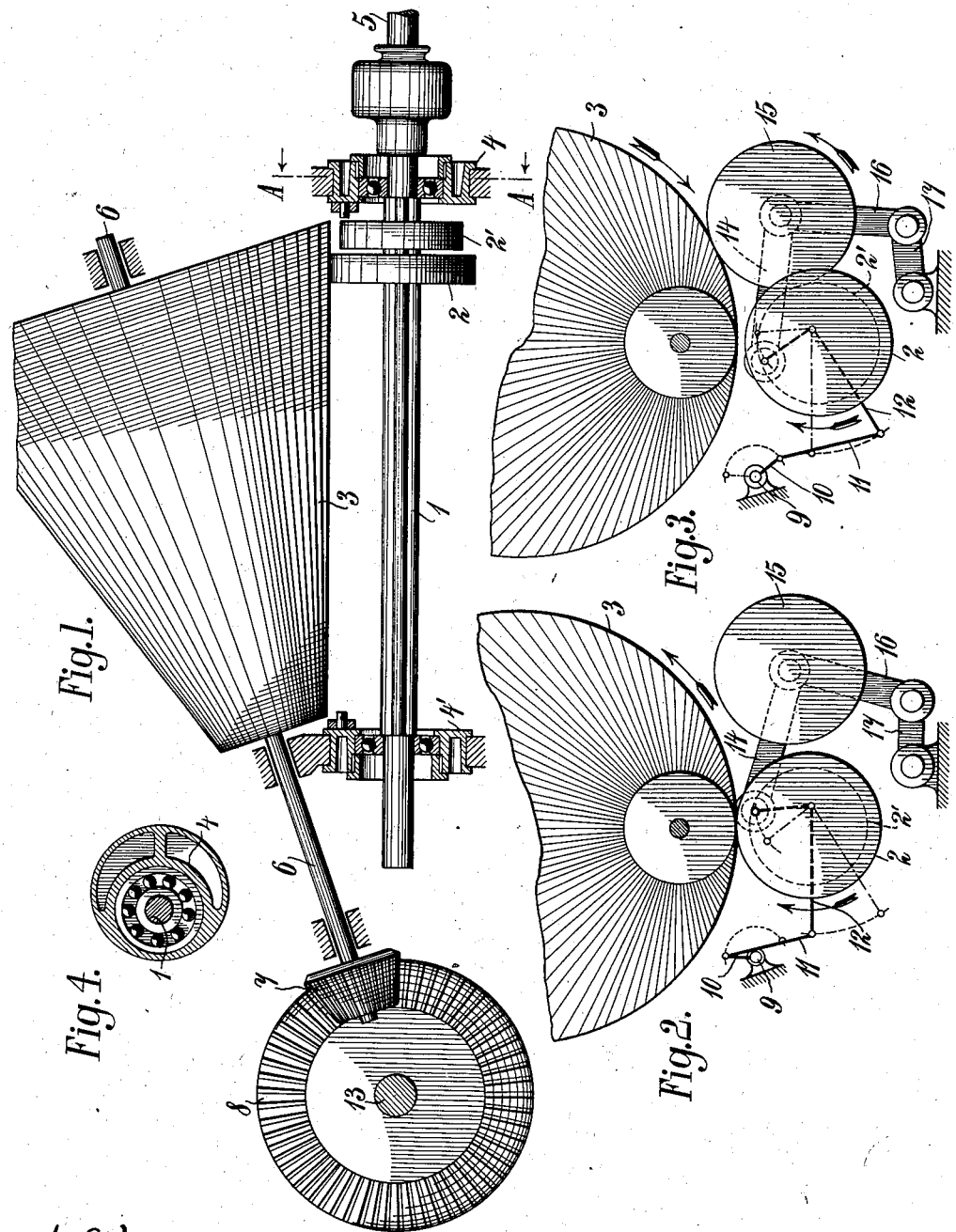
Witnesses
Robert Caldwell
Ada L. Stevens
Inventor
Wilhelm von Pittler
By Redding, Kiddle & Greeley
Attys

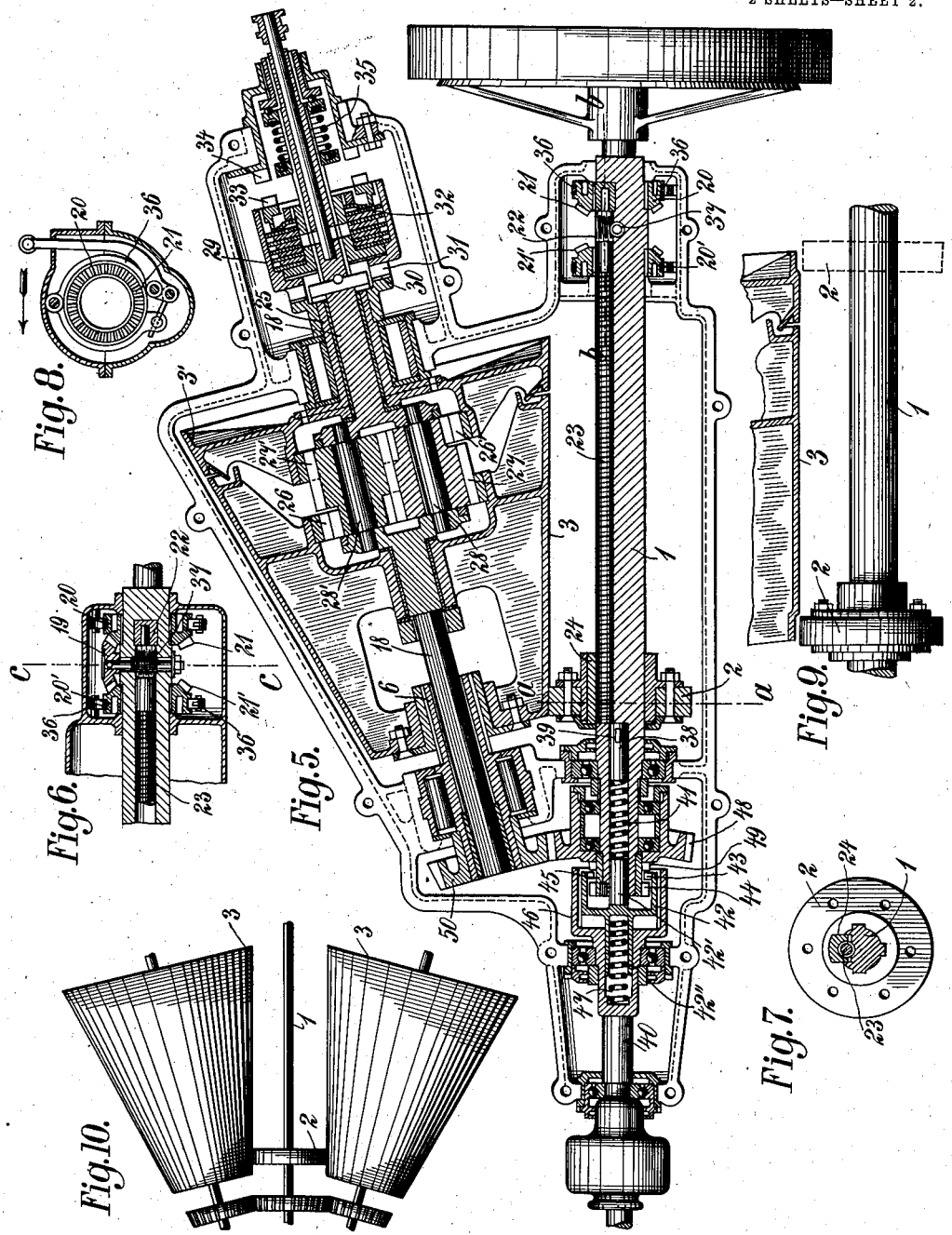

UNITED STATES PATENT OFFICE.

WILHELM VON PITTLER, OF BERLIN, GERMANY.

POWER-TRANSMISSION DEVICE FOR MOTOR-CARS, &c.

No. 827,117.            Specification of Letters Patent.           Patented July 31, 1906.

Application filed December 12, 1905. Serial No. 291,391.

*To all whom it may concern:*

Be it known that I, WILHELM VON PITTLER, a subject of the King of Prussia, German Emperor, residing at Berlin, in the Kingdom of Prussia, in the Empire of Germany, have invented certain new and useful Improvements in Power-Transmission Devices for Motor-Cars, &c., of which the following is a specification, reference being had to the accompanying drawings, forming a part hereof.

My invention relates to power-transmission devices or driving-gear for motor-cars or the like in which is employed speed-changing gear, consisting of a conical drum and a friction-wheel slidable along its convex surface.

One of the important features of my invention is that the friction-wheel is arranged on the driving-shaft—for example, a motor-shaft—that is to say, it forms the driving part of the driving-gear, while the conical drum is the driven part. In consequence, when the motor-car goes slowly—for example, when heavily laden and in going up gradients—the power-transmission takes place at the greatest diameter of the conical drum, and consequently the loss of efficiency is not so great as would otherwise be the case.

Another feature of my invention is a device the purpose of which is to slide the friction-wheel on its shaft in order to vary the speed.

Still another feature of my invention consists in a special arrangement by means of which at each forward speed the reversal of the direction of motion of the car can be brought about, causing a backward motion at a slow speed.

The accompanying drawings illustrate a driving-gear embodying my invention.

Figure 1 shows one form of my new driving-gear in top view and partly in longitudinal section. Fig. 2 is a section at the line A A of Fig. 1 seen in the direction of the arrow. Fig. 3 is a similar section of the reversing device in another position. Fig. 4 is a transverse section of a bearing of the friction-wheel shaft. Fig. 5 shows another arrangement of my driving-gear in horizontal longitudinal section. Fig. 6 is a vertical section at the line *b b* of Fig. 5. Fig. 7 is a transverse section at the line *a a* of Fig. 5. Fig. 8 is a section at the line *c c* of Fig. 6. Fig. 9 shows a modified detail, partly in section, corresponding to Fig. 5. Fig. 10 shows a driving-gear with two friction-cones.

Similar numerals of reference refer to similar parts in all the views.

The driving-gear, as shown in Figs. 1 to 4, has a shaft 1 placed in bearings 4 and 4' and driven direct from the motor by means of a yielding—that is to say, jointed or flexible—shaft 5. On the shaft 1 is a friction-pulley 2, which can be shifted longitudinally, and a fixed friction-wheel 2'. A conical drum 3 is fastened on a shaft 6, which is mounted obliquely to the shaft 1. The shaft 6 drives, by means of the toothed wheels 7 and 8, the transverse shaft 13, which drives the driving-wheels or a differential gear on the shaft 13.

The shaft 1 is driven by the motor at a constant speed. A variation of the speed of the car is obtained by the shifting of the friction-wheel 2 on the shaft 1, so that it is applied at different diameters of the conical drum 3. The displacement of the friction-wheel 2 can be effected by any suitable means. A preferred device for the purpose is shown in connection with the driving-gear in Figs. 5 to 9 and will be described with reference thereto. The car runs at a slow speed with the friction-wheel 2 in the position shown in Fig. 1. By displacement to the left the speed is gradually increased.

One arrangement for stopping the car and for effecting the reversal of the direction of movement is shown in Figs. 1 to 4. The bearing-bodies 4 4', which carry the shaft 1, are formed as eccentrics. By the rotation of these bearing-bodies the shaft 1 can be moved away from the drum 3 or against the same in such a way that the friction-wheel 2 is withdrawn from the drum 3, Fig. 3, or pressed against it, Fig. 2. Both the bearing-bodies 4 4' are, for example, so joined one with the other by means of an axle 9 and lever mechanism 10 11 12 that when turned by means of a hand-lever they have the same movement, and thus the motor-shaft 1 is always shifted in parallelism. It will be understood that the representation of the levers in Figs. 2 and 3 is diagrammatic merely and that for greater clearness in these figures the bearing-bodies 4 and the shaft 1 are not shown. An angle-lever 12 is shown in the place of the bearing-body, and as the fulcrum of the lever lies in the rotating axis of the bearing-bodies 4 and 4' the lever is the equivalent of such bearing-body. A second friction-wheel 2' of rather smaller diameter than the friction-wheel 2 is secured to the shaft 1 in line with the greatest diameter of the cone. A distance-rod 14 engages the bearing-body 4 on the same side and in its free end is mounted the axle of a friction-wheel 15. Both the friction-wheels 2 and 15 are thereby in such relation to one another that the one moves against the cone 3 as the other moves off. If the friction-wheel 2 is pressed against the cone, Fig. 2, the car runs forward. On the other hand, if the friction-wheel 2 is moved off and the friction-wheel 15 is pressed against it, Fig. 3, the friction-wheel 15 comes simultaneously into contact with the cone and with the friction-wheel 2' and effects a reversal of the direction of rotation of the cone and also of the direction of travel. Between the positions for going forward and backward there is a position corresponding to the motor running free, in which neither of the friction-wheels 2 15 touches the cone 3. In its idle position the friction-wheel 15 is supported by means of jointed levers 16 17, which do not prevent its free movement in being thrown into operation, so that a uniform application of the friction-wheel 2' to the cone is assured.

In the arrangement of the driving-gear shown in Figs. 5 to 9 the main shaft to be driven is coaxial with the motor-shaft and can be coupled direct therewith. On the motor-shaft 1, Fig. 5, is placed a friction-pulley 2, so that it can be shifted longitudinally, it being in contact with a conical drum 3, which is free to rotate on a shaft 18, supported obliquely. In line with the shaft 1 is placed the main shaft 40, which transmits power to the driving-wheels of the vehicle. In an axial recess in the shaft 1 is placed a bolt 38, which is normally held by means of spring 41 in the extreme right-hand position. The bolt 38 has a pin 39 which projects out of the shaft through a slot, which permits movement of the bolt to the left. On the end of the shaft 1 is fastened a coupling-sleeve 45, which is provided with lugs 44. A toothed wheel 48 is free to rotate on the shaft 1 and is in engagement with a toothed wheel 50 on a hollow shaft 6, which is secured to the drum 3 and receives the shaft 18. On the boss of the toothed wheel 48 are provided lugs 49, corresponding to the lugs 44 of the coupling-sleeve 45, but separated therefrom by a space. The shaft 40 is enlarged at its end to form a box 46. Within this box a coupling 42 is placed and connected by means of a tongue and groove, so that it rotates with the shaft 40 in rotation, but can be shifted in the direction of its axis. The coupling 42 has lugs 43, which lie in the position illustrated between the lugs 44 and 49 and by displacement of the coupling 42 to the one or the other side can be brought into engagement with either the lugs 44 or the lugs 49. The coupling 42 has an axial projecting stem 42', entering the axial recess in the shaft 1 and bearing against the spring 41, arranged therein. A hollow stem 42'' projects axially on the other side and enters an axial recess in the shaft 40. A spring 47 is placed in the recesses in the shaft 40 and the stem 42'', bearing against the coupling 42, and is stiff enough to overcome the pressure of the spring 41, which acts from the other side. In this way the coupling 42 is held normally in the extreme position to the right, in which position its lugs 43 are in engagement with the lugs 49 of the toothed wheel 48, so that the shaft 40 is normally driven by the shaft 1 through the intervention of the wheel 2 of the drum 3 and the toothed wheels 48 and 50.

In the position shown in Fig. 5 the friction-wheel 2 is pushed so far to the left that it has hit the pin 39 of the bolt 38 and through the intervention of the spring 41 has pushed the coupling 42 so far to the left that its lugs 43 are between the lugs 44 and 49. The direct coupling of the shafts 1 and 40 is effected when the friction-pulley 2 is shifted still farther to the left, so that the lugs 43 of the coupling 42 engage the lugs 44 of the coupling 45, which rotates with the shaft 1. The shaft 1 then drives the shaft 40 direct. If the friction-wheel 2 is again moved to the right, the coupling is automatically shifted again through the action of the spring 47, so that the lugs 43 and 49 engage one another. The speed ratios between the friction-pulley 2 and the drum 3 and between the toothed wheels 50 and 48 are such that the speed of the shaft 40 is greatest when direct coupled with the shaft 1. It is best to prevent contact between the friction-pulley 2 and the drum 3 in the direct coupling of the shaft 1 and 40, since otherwise unnecessary wear and tear takes place and losses due to friction arise. To accomplish this, the friction-pulley 2 may be shifted to the left clear of the drum 3, or the diameter of the drum at the end may be further reduced or set off, as shown in Fig. 9.

At the extreme right-hand end the drum 3 is continued by a special narrow drum 3', which is so coupled with the drum 3 by means of a special intermediate reversing-gear coupling that the two drums shall rotate together, or that they shall rotate in opposite directions, or that the drum 3' shall rotate while the drum 3 is stationary. Thus upon the movement of the friction-pulley 2 to engage the drum 3' through the manipulation of the coupling the car shall run backward or stand still. Each of the drums 3 and 3' is provided with an internal gear 26 and 26', connection between the two being effected by means of gears 27 and 27' gearing into one another and respectively with the internal gear 26 and the internal gear 26'. The gears 27 27' are free on eccentric bolts 28 and 28', respectively, by which bolts the two parts of the shaft 18, interrupted to permit the described arrangement of the gear-coupling, are joined into one rigid whole. The drum 3', like the drum 3, is rotatable on the shaft 18. It is secured to a coupling-sleeve 25, which carries at its opposite end lugs 30. Opposed to these are the lugs 31 of a coupling 29, which is mounted on the shaft 18 with a tongue-and-groove connection, so as to turn therewith and be movable longitudinally. The coupling 29 has other lugs 33 at the other end corresponding to lugs 34 on the stationary casing. If the lugs 31 are in engagement with the lugs 30, as illustrated, the drum 3' is coupled to the shaft 18, so that if the drum 3 is driven by means of the friction-pulley 2 the shaft 18 rotates at the same speed and no relative movement between the gear 26' and the axle 28' of the gear 27' takes place. Consequently the gear 27 does not rotate, but carries the gear 26 around with it—that is to say, the driving-gear 26' 27' 27 26 operates as a rigid coupling and the drum 3 runs at a like speed and in the same direction as the drum 3', or, in other words, the drums 3' and 3 form, as it were, one single drum when the parts are in the positions illustrated. These positions will be generally maintained in traveling or driving.

The coupling 29, and with it the shaft 18, may be held from rotation, for example, by engagement of lugs 33 with fixed lugs 34. The bolts 28 28', carried by the shaft 18, are then likewise held stationary, and the gears 27 27' work simply as intermediate gearing between the drums 3' and 3, and direction of motion of the drum 3 is opposed to that of the directly-driven drum 3'. The relative speeds of the two drums depend on the sizes of the gears 26 26' 27 27'. As shown in the drawings, gears 26 and 26' and gears 27 and 27' are of equal size, respectively, so that the drum 3 rotates at the same speed and in an opposite direction to the drum 3' in the case of the engagement of the lugs 33 with lugs 34. Under these conditions a backward movement of the car takes place.

If the coupling 29 is in its middle position, no engagement of its lugs takes place. Then the shaft 18 is neither held fast nor coupled with the drum 3', and in consequence of the resistance of the vehicle-wheels through the drum 3 and the toothed wheel 26 the gear 26 stands still and the gear 27 runs freely on it, so that the shaft 1 rotates idly in the same direction as the drum 3'. Thus in order to bring the car to a standstill the coupling 33 is placed in the middle position. In order to be able to stop the drum 3' and the shaft 18, the drum 3' may be reduced in diameter at its outermost end, as shown in Fig. 9. Between the parts of the coupling 29, carrying the lugs 31 and the lugs 33, is a friction-coupling 32 of ordinary construction to reduce the corresponding shock when the lugs are thrown into engagement. The proper yielding pressure between the drum 3 and the friction-pulley may be obtained through the action of a pressure-spring 35, acting between the casing and a collar on the shaft 18.

For shifting the friction-pulley 2 on the shaft 1 a reversing-gearing of a special construction may be used. In a transverse recess of the shaft 1 is placed a worm 37, on the axle of which a bevel-gear 19 is secured. The latter engages two bevel-gears 21 21', which are carried by the brake-disks 20 20', respectively, loose on the shaft 1. The worm 37 engages a worm-wheel 22 on a screw-shaft 23, which lies in a longitudinal groove of the shaft 1, Figs. 5 and 6, and engages a female thread formed in a block 24, fixed in the hub of the pulley 2, the block 24 in the rotation of the pulley and shaft working like a key, Fig. 7. Brake-blocks 36 are applied to the disks 20 and 20' and may be operated by levers, as shown in Fig. 8. If the brake-blocks of both brake-disks are slack, both the brake-disks are carried around by the gear 19 and by friction on the shaft and rotate with the shaft. Rotation of the worm 37 on its axis does not then take place nor any relative rotation of the screw-shaft 23 with respect to the shaft 1, so that the pulley 2 remains in its position. If, however, for example, the brake-blocks of the disk 20 are tightened, such disk 20, and with it the gear 21, are held from rotation. Then the gear 19 runs on the gear 21 and turns the worm 37, the motion of which is transmitted, by means of the worm-wheel 22, to the screw-shaft 23. By braking the other disk 20' the screw-shaft 23 is rotated in the opposite direction. Thus as the one or the other brake-disk is held fast a shifting of the friction-pulley in the one or other direction takes place. Two similar drums on opposite sides of the shaft 1 may be provided instead of one single conical drum, (see Fig. 10,) so that the power of the friction-pulley 2 is applied at two places in the same diametrical line, in which case the demand on the shaft is less and the transmission of the motion is better assured.

What I claim, and desire to secure by Letters Patent, is—

1. A power-transmission device comprising a friction-wheel a shaft therefor upon which it is longitudinally movable, means for shifting such wheel longitudinally, comprising two bevel-gears mounted loosely on the shaft, brake-disks mounted with said gears respectively, independent brakes therefor, a bevel-gear mounted transversely with respect to the shaft and in engagement with the first-named bevel-gears, a screw-shaft supported by the first-named shaft and engaging the friction-wheel to shift the same longitudinally, and connections between the last-named bevel-gear and the screw-shaft to rotate the latter from the former.

2. A power-transmission device comprising a conical friction-drum and a friction-wheel and shaft therefor upon which said wheel is longitudinally movable for coöperation with said drum, means for shifting such wheel longitudinally comprising two bevel-gears mounted loosely on the shaft, brake-disks mounted with said gears respectively, independent brakes therefor, a bevel-gear mounted transversely with respect to the shaft and in engagement with the first-named bevel-gears, a screw-shaft supported by the first-named shaft and engaging the friction-wheel to shift the same longitudinally, and a worm-gearing between the last-named bevel-gear and the screw-shaft to rotate the latter from the former.

3. A power-transmission device comprising a conical friction-drum, a friction-wheel to coöperate with said drum, a shaft upon which said wheel is mounted, means for shifting said wheel longitudinally, a second friction-wheel fixed on the shaft for coöperation with the drum at its greatest diameter, an intermediate friction-wheel coöperating with the fixed friction-wheel and the drum and movable bearings for said shaft and said intermediate friction-wheel whereby either the movable friction-wheel or the intermediate friction-wheel can be moved into contact with the drum to change the direction of rotation of the drum.

4. A power-transmission device comprising a conical friction-drum, a friction driving-wheel to coöperate with said drum, a shaft upon which said driving-wheel is longitudinally movable, means for shifting such wheel longitudinally, movable bearings in which said shaft is mounted whereby the friction-wheel can be moved into and out of engagement with the drum, a second friction-wheel fixed on said shaft, an intermediate friction-wheel to make contact with the fixed friction-wheel and the drum, and means whereby the intermediate friction-wheel is moved into contact with the fixed friction-wheel and the drum as the movable friction-wheel is moved out of contact with the drum.

In testimony whereof I have signed my name to this specification in the presence of two subscribing witnesses.

WILHELM VON PITTLER.

Witnesses:
JOHANNES HUI,
HENRY HASPER.